(12) United States Patent
Kruger et al.

(10) Patent No.: US 8,172,318 B2
(45) Date of Patent: May 8, 2012

(54) VEHICLE SEAT

(75) Inventors: Mathias Kruger, Tubingen (DE);
Markus-Claus Kubler, Schoemberg (DE); Roland Traub, Schonaich (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 187 days.

(21) Appl. No.: 12/712,014

(22) Filed: Feb. 24, 2010

(65) Prior Publication Data
US 2010/0237669 A1  Sep. 23, 2010

(30) Foreign Application Priority Data
Mar. 21, 2009  (DE) .......................... 10 2009 014 335

(51) Int. Cl.
*B60N 2/42* (2006.01)
(52) U.S. Cl. ............ 297/216.1; 297/216.19; 297/452.18

(58) Field of Classification Search ............... 297/216.1, 297/452.18, 216.19
See application file for complete search history.

(56) References Cited

U.S. PATENT DOCUMENTS

| | | | | |
|---|---|---|---|---|
| 4,231,615 A | * | 11/1980 | Griffiths | 297/452.18 |
| 5,176,425 A | * | 1/1993 | Sakamoto | 297/452.18 |
| 5,400,490 A | | 3/1995 | Burchi | |
| 6,371,561 B1 | * | 4/2002 | Iwamoto et al. | 297/452.18 |
| 7,784,866 B2 | * | 8/2010 | Yoshikawa et al. | 297/216.1 X |
| 2010/0133732 A1 | * | 6/2010 | Yamaguchi et al. | 297/216.1 |

FOREIGN PATENT DOCUMENTS

| | | |
|---|---|---|
| DE | 694 09 946 | 3/1999 |
| DE | 20 2006 001 218 | 5/2006 |
| JP | 2007331445 A | * 12/2007 |

* cited by examiner

*Primary Examiner* — Anthony D Barfield
(74) *Attorney, Agent, or Firm* — Gerald E. Hespos; Michael J. Porco

(57) ABSTRACT

A vehicle seat has a pad carrier with a wire frame and a seat cushion that rests on the pad carrier. The seat cushion structure is connected to the pad carrier and absorbs energy by deformation in the event of high forces.

5 Claims, 2 Drawing Sheets

VEHICLE SEAT

CROSS-REFERENCE TO RELATED APPLICATIONS

This application claims priority under 35 USC 119 to German Patent Application No. 10 2009 014 335.1 filed on Mar. 21, 2009, the entire disclosure of which is incorporated herein by reference.

BACKGROUND OF THE INVENTION

1. Field of the Invention

The invention relates to a vehicle seat, in particular for rear seat benches of passenger motor vehicles.

2. Description of the Related Art

DE 20 2006 001 218 U1 discloses a generic vehicle seat having a separate pad carrier for a seat cushion. A front section of the pad carrier in the direction of travel has a ramp that runs in the seat transverse direction and that projects up beyond remaining regions of the seat cushion rearward of the ramp. The pad carrier is a wire frame with an outer contour wire. Longitudinal wires run in the direction of travel and are supported on front and rear parts of the wire frame. An additional support frame has at least three support wires or support tubes running transverse to the direction of travel. The structural integration of supporting elements into a wire frame enables production of a separate assembly to be disposed between a rest surface of the body and a foam body of the vehicle seat. Thus, the wire frames can be produced economically even in relatively small unit quantities and can be used instead of the previously conventional shell-shaped pad carriers.

A forward displacement of the occupant sitting on the vehicle seat creates a heavy load on a seat anchoring of a seat cushion to the bodyshell and forms a weak point, particularly in the event of a crash. Previously known seat cushions transmit the forces exerted on them in the event of an accident directly to the seat anchorings, and the seat cushion can be torn from its anchoring under some circumstances.

The invention is concerned with the problem of specifying for a generic vehicle seat an improved or at least alternative embodiment that has improved crash behavior.

SUMMARY OF THE INVENTION

The invention relates to a vehicle seat having a pad carrier formed as a wire frame and having a seat cushion that rests on said pad carrier. A seat cushion structure is connected to the pad carrier and absorbs energy by deformation in the event of high forces. The seat cushion structure can be deformed in the event of a crash, and therefore absorbs impact energy and converts this impact energy into deformation energy so that considerably reduced forces need be transmitted to and absorbed by the seat anchorings, as compared to conventional vehicle seats. The energy-absorbing seat cushion structure is a deformation element that absorbs crash energy in the event of a frontal collision and also in the event of a rear-end collision, with or without a vehicle occupant, by means of a targeted and predefined deformation. Therefore, the vehicle seat of the invention can absorb impact energy by deformation so that the risk of failure of the anchorings of the seat cushion can be reduced considerably as to conventional vehicle seats. Furthermore, the seat cushion structure of the invention and also the wire frame surrounding said seat cushion structure of the pad carrier are designed to hold or mount a seat cushion foam.

The invention may include the above-described wire frame connected to a force-introducing element. More particularly, the wire frame of the seat cushion structure may be connected by the individual wires to the wire frame of the pad carrier. The wire frame of the seat cushion may be designed or attached to the wire frame of the pad carrier in such a way that the seat cushion structure can deform in a predefined manner in the event of a vehicle crash, thereby absorbing impact energy. The force-introducing element introduces into the seat cushion structure a predefined and substantially uniform force from the forces that occur in the event of an accident. Thus, the seat cushion structure is loaded not only in a punctiform manner, but rather where possible uniformly, and preferably in an exactly predefined manner. The force-introducing element may be a shell or a plate that provides additional support for the seat cushion foam of the vehicle seat.

It is self-evident that the features specified above and the features yet to be explained below can be used not only in the respectively specified combination, but rather also in other combinations or individually without departing from the scope of the present invention.

Preferred exemplary embodiments of the invention are illustrated in the drawings and are explained in more detail in the following description, with the same reference signs relating to identical or similar or functionally identical components.

DETAILED DESCRIPTION OF THE PREFERRED EMBODIMENT

Figure 1:
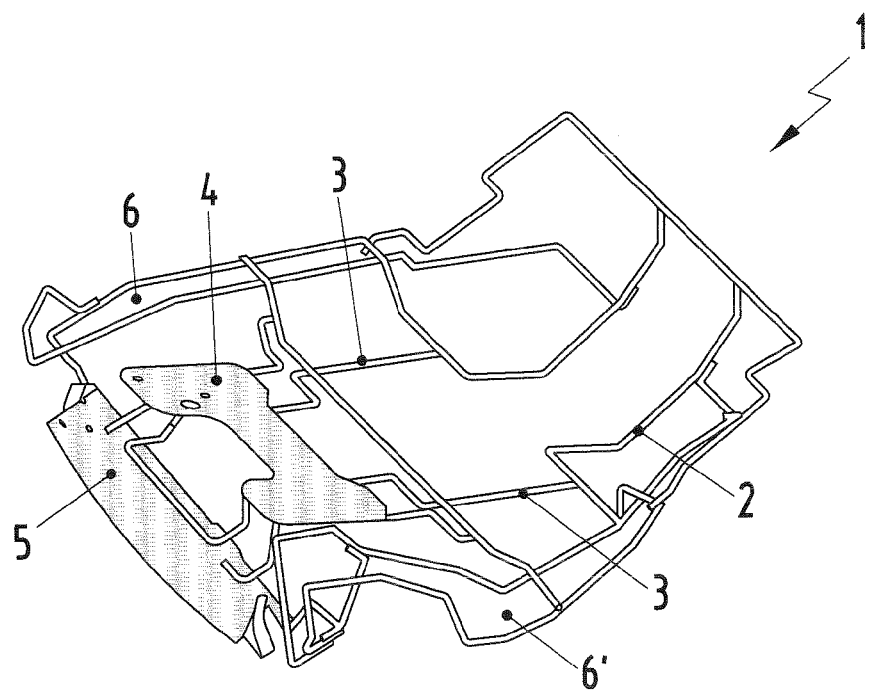
FIG. 1 is a perspective view of a pad carrier, with an integrated seat cushion structure according to the invention.

A vehicle seat in accordance with the invention is identified by the numeral 1 in FIGS. 1-4. The vehicle seat 1 has a pad carrier 2 and a seat cushion C rests on the pad carrier 2 in a conventional manner. A seat cushion structure 3 is connected to the pad carrier 2 and is deformable to absorb energy in the event of high forces, such as in the event of an accident, thereby reducing the forces acting on an anchoring of the vehicle seat 1. The seat cushion structure 3 also is formed as a wire frame and is equipped with, or connected to, a force-introducing element 4. The force-introducing element 4 may be formed from metal or plastic, and preferably is a plate or shell.

Figure 2:
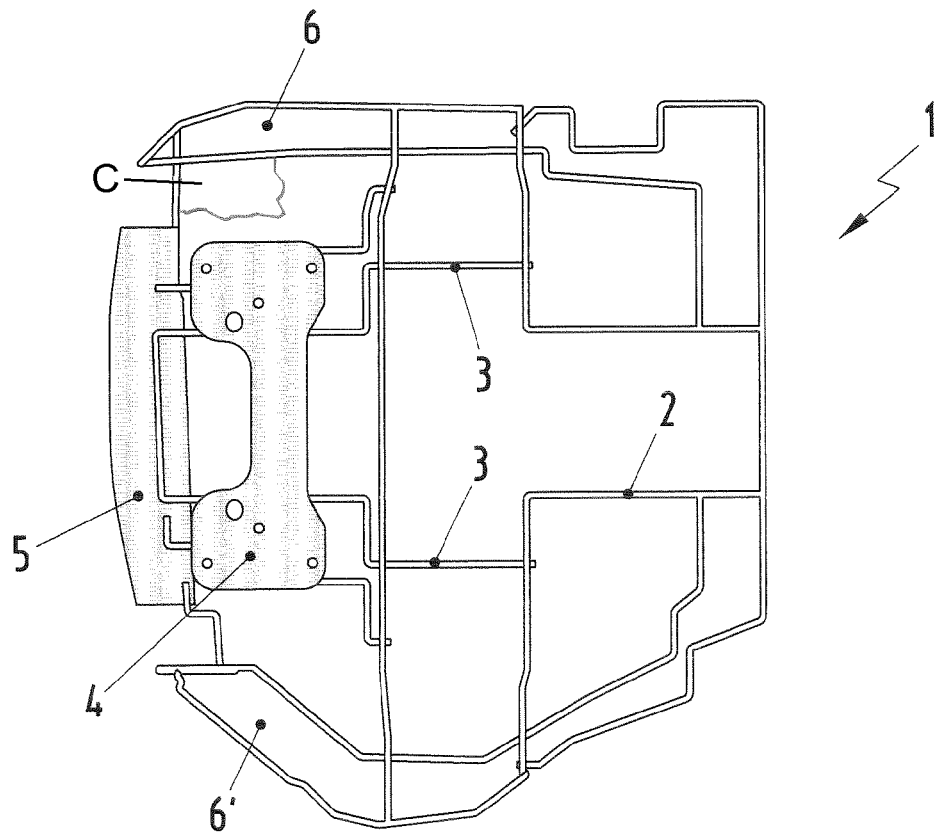
FIG. 2 is a top plan view of the pad carrier and integrated seat cushion structure of FIG. 1.

The wire frame of the seat cushion structure 3 is connected to the wire frame of the pad carrier 2 at a plurality of points, as shown in FIGS. 1-4. Additionally, the front end region of the seat cushion structure 3 also is connected to a connecting element 5 for attaching the vehicle seat 1 to a bodyshell (not shown) of the motor vehicle. The deformable energy-absorbing seat cushion structure 3 is arranged between two seat side bolsters 6 and 6', as shown in FIGS. 1 and 2, so that the sear cushion structure 3 is restricted to a region situated between the two seat side bolsters 6 and 6'.

Figure 3:
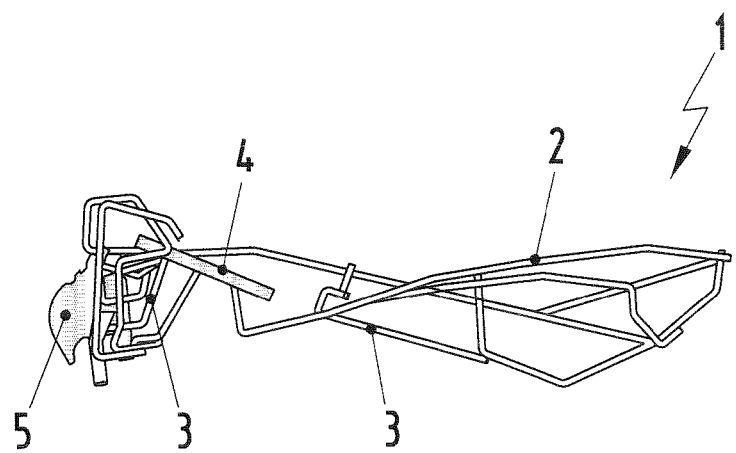
FIG. 3 is a side view of the vehicle seat illustrated in FIG. 1.
Figure 4:
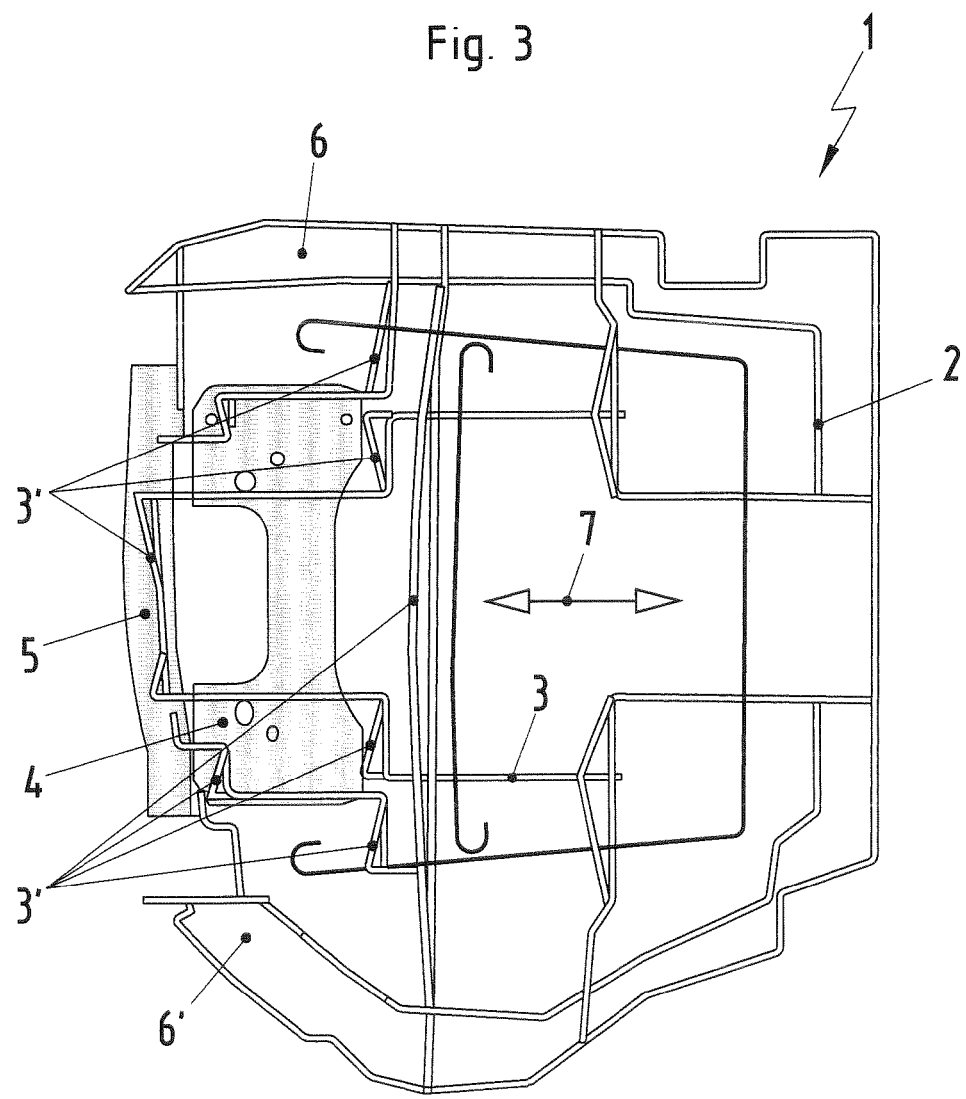
FIG. 4 shows the seat cushion structure according to the invention before and after a deformation.

The element 3' in FIG. 4 denotes the seat cushion structure 3 after the occurrence of a deformation, such as after an accident has taken place. More particularly, a deformation of the seat cushion structure 3 takes place substantially in the vehicle longitudinal direction 7. During a deformation, the wire frames that initially are at substantially right angles in FIG. 3, are bent into a z-shaped configuration, as shown in FIG. 4. The introduction of force into the seat cushion structure 3 preferably takes place via the force-introducing element 4 to obtain a substantially uniform introduction of force into the seat cushion structure 3. The design of the force-introducing element 4 may be calculated by so-called finite element methods.

Only a seat surface has been shown in FIGS. 1-4 for the vehicle seats 1, with the backrest having been omitted for clarity. The vehicle seat illustrated in FIGS. 1-4 is conventionally a seat surface for a rear bench of a motor vehicle. Thus, the vehicle seat 1, that is to say the seat surface or the seat cushion, conventionally is attached or fastened by seat anchorings to the bodyshell or body of the motor vehicle. The seat anchorings are subjected to excessive loading in the event of an accident, with an associated forward displacement of the occupants. As a result, there is the risk of the seat cushion or the vehicle seat 1 being torn out of its seat anchoring. This possibility is counteracted by the vehicle seat 1 of the invention by virtue of the deformable seat cushion structure 3 of said vehicle seat 1, which converts part of the impact energy into deformation work. Accordingly, less force is transmitted to the seat anchorings. The seat cushion structure 3 is deformed in an intermediate plane above a rest surface and below a seat cushion foam. Therefore, the seat cushion structure 3 is not visible from the outside and cannot be felt when the vehicle seat 1 is sat on in the normal way, but rather is active only in the event of a crash. Here, it is self-evidently conceivable for only the deformed seat cushion structure 3' of the vehicle seat 1 to have to be exchanged after an accident, such that the remainder of the vehicle seat 1, that is to say the pad carrier 2, can continue to be used.

What is claimed is:

1. A vehicle seat comprising:
   a pad carrier formed as a wire frame;
   a seat cushion that rests on the pad carrier;
   a seat cushion structure formed from a plurality of wires connected to the wires of the pad carrier, each of the wires of the seat cushion structure including a front longitudinal wire segments extending substantially parallel to a vehicle travel direction and disposed in proximity to a front area of the vehicle seat, a rear longitudinal wire segment extending substantially parallel to the vehicle travel direction and disposed rearward of the front longitudinal wire segment and a transverse wire segment extending transverse to the vehicle travel direction between a rear end of the front longitudinal wire segment and a front end of the rear longitudinal wire segment; and
   a force introducing plate connected to the front longitudinal wire segments of the seat cushion structure and disposed forward of the transverse wire segments of the seat cushion structure so that the transverse segments of the wires of the seat cushion structure deform and permit movement of the force introducing plate and the front longitudinal wire segments relative to the rear longitudinal wire segments to absorb energy in the event of high forces.

2. The vehicle seat of claim 1, wherein the force-introducing element is a shell from metal or plastic.

3. The vehicle seat of claim 2, wherein the seat cushion structure performs a defined deformation movement in the event of forces acting in the vehicle longitudinal direction.

4. The vehicle seat of claim 1, wherein the seat cushion structure has a front end region connected to a connecting element for attaching to a bodyshell of the motor vehicle.

5. The vehicle seat of claim 1, wherein the seat cushion structure is restricted to a region between two seat side bolsters.

\* \* \* \* \*